United States Patent [19]
Fenelon

[11] Patent Number: 5,333,496
[45] Date of Patent: Aug. 2, 1994

[54] IN-LINE PARALLEL PROPORTIONALLY PARTITIONED BY-PASS METERING DEVICE AND METHOD

[76] Inventor: Paul J. Fenelon, 13 Inverary, Nashville, Tenn. 37215

[21] Appl. No.: 848,053

[22] Filed: Mar. 9, 1992

[51] Int. Cl.$^5$ .............................................. G01F 5/00
[52] U.S. Cl. ...................................................... 73/202
[58] Field of Search ............................... 73/202, 202.5

[56] References Cited

U.S. PATENT DOCUMENTS

| | | | |
|---|---|---|---|
| 749,645 | 1/1904 | Tuttle | 73/202 |
| 3,017,772 | 1/1962 | Wright . | |
| 3,083,577 | 4/1963 | Dieterich . | |
| 3,314,290 | 4/1967 | Peranio | 73/202 |
| 3,425,277 | 2/1969 | Adams | 73/202.5 |
| 3,559,482 | 2/1971 | Baker et al. | 73/202 |
| 3,581,565 | 6/1971 | Dieterich . | |
| 3,719,082 | 3/1973 | Obermaier et al. | 73/202 |
| 3,803,921 | 4/1974 | Dieterich . | |
| 4,041,757 | 8/1977 | Baker et al. | 73/202.5 |
| 4,442,720 | 4/1984 | Apley et al. . | |
| 4,961,344 | 10/1990 | Rodder | 73/202 |

FOREIGN PATENT DOCUMENTS 1326889  7/1987  U.S.S.R. .

OTHER PUBLICATIONS

Schlumberger Industries, Water Division, Condensed Catalog, 1991.
Schlumberger Industries, Water Division, T-10 Small, Apr. 1990.
Invalco, Liquid Turbine Flowmeters, IUC-211, Nov. 1991.
James W. Murdock, Fluid Mechanics and Its Applications, pp. 298-310, Houghton Mifflin Co., 1976.
Ginesi, Try Insertion Flowmeters For Low-Cost "Hot-Tap" Installations, Power Mar. 1987.
Bean, Fluid Meters: Their Theory and Application, Report of ASME Research Committee on Fluid Meters, 6th Ed., 1971.
Mattingly, Volume Flow Measurements, in Fluid Mechanics Measurement, pp. 245-248, 264-265 (R. Goldstein ed., 1983).
Flow Measurement Engineering Handbook 2nd ed., pp. 6-2 & 6-3, edited by R. W. Miller, McGraw Hill, New York, 1989.

Primary Examiner—Herbert Goldstein
Attorney, Agent, or Firm—Harness, Dickey & Pierce

[57] ABSTRACT

An apparatus and method are disclosed for accurately and economically measuring fluid flow within a closed conduit system. The apparatus includes a means for extracting a proportional amount of the fluid flow, a flowmeter reduced in size from the main conduit system for measuring the flow of the extracted proportional amount of fluid, and a means for returning the extracted portion of fluid to the fluid flow. The fluid flow is extracted and returned without disrupting the fluid flow. A means for promoting the extraction of the proportional amount of fluid flow is provided within said conduit between the means for extracting and returning the fluid flow.

13 Claims, 1 Drawing Sheet

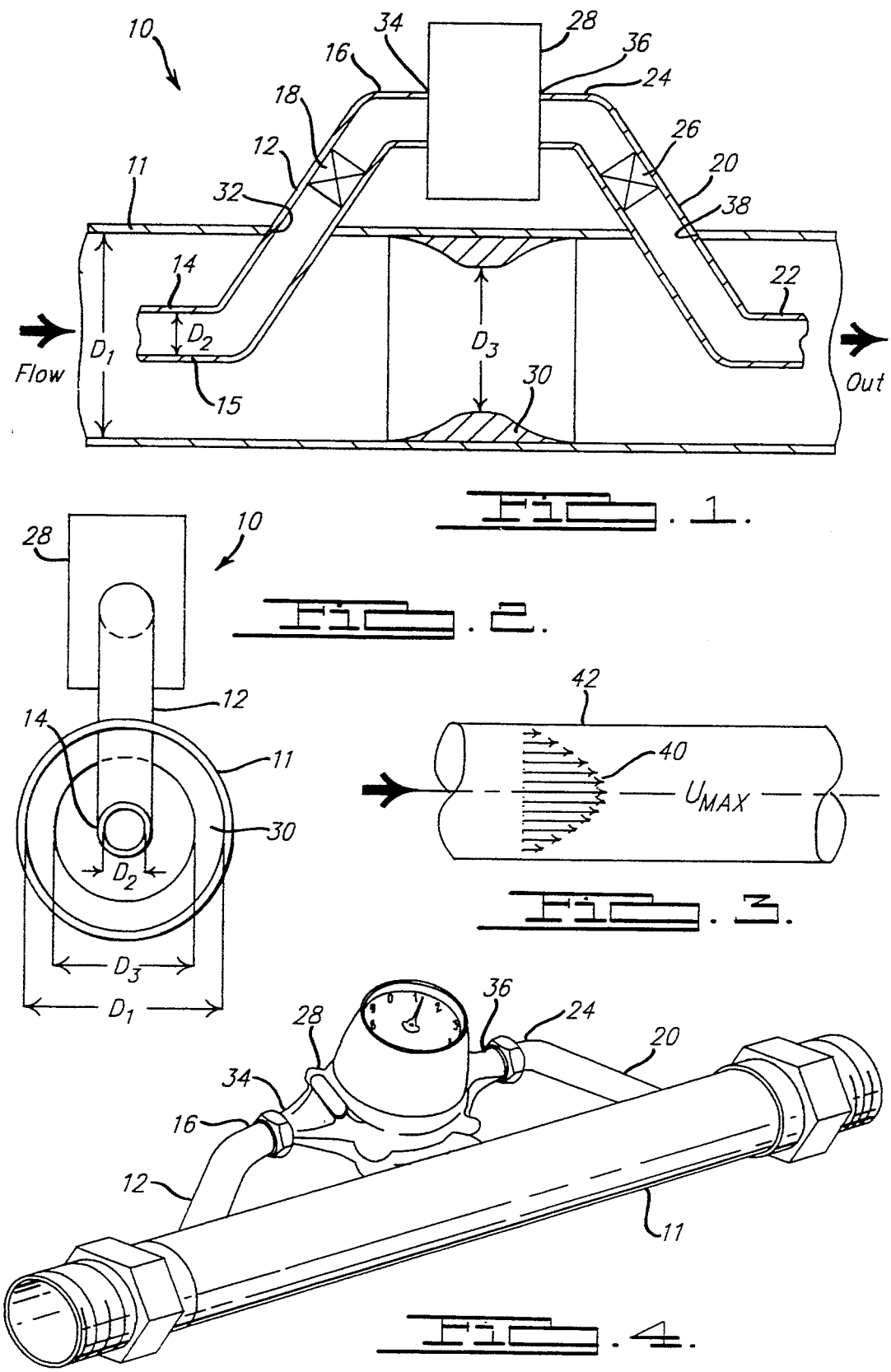

IN-LINE PARALLEL PROPORTIONALLY PARTITIONED BY-PASS METERING DEVICE AND METHOD

BACKGROUND OF THE INVENTION

This invention relates generally to the measurement of fluid flow. More particularly, the present invention is directed towards an in-line parallel proportionally partitioned by-pass metering device and method of measuring fluid flow within a closed conduit system.

Fluid flow measurement is widely practiced and fulfills an array of purposes including energy distribution, custody transfer, regulation, control and research. The measuring unit, i.e. "flowmeter", typically consists of a primary and a secondary device. The primary device is acted upon by the fluid directly, and the secondary device converts the primary device's response to the fluid into an observable quantity. Flowmeters are generally classified into those which measure quantity of fluid flow and those which measure rate.

Because of the wide practice of fluid flow measurement, engineers have a greater choice when specifying a flowmeter than for perhaps any other process measuring, monitoring device. Currently, there are over one hundred types of flowmeters available, and expenditures on flowmeters exceed one billion dollars per year. Thus in choosing a flowmeter, an engineer will typically evaluate: (1) the degree of accuracy and/or precision required, (2) the suitability of the flowmeter to the particular application and conditions, and (3) the cost of the various alternative flowmeters and other limitations such as space requirements, and the like.

The selection of a flowmeter requires an understanding of the flow behavior of fluids. First, a fluid is any matter which undergoes continuous deformation upon being subjected to shearing forces. Viscosity is that property of a fluid by which it offers resistance to deformation or shear. The response of a fluid subjected to shearing forces is "flow". The type of flow, whether laminar, turbulent, cavitational, or some combination, depends upon the fluid viscosity and other parameters of the fluid flow system. Second, a fluid in motion, i.e., flowing, possesses energy. This energy may be displacement or pressure energy, velocity or kinetic energy, potential energy, thermal or internal energy, or some combination of these forms of energy. Flowmeters utilize the energy of a fluid in motion to monitor fluid flow. Therefore, an engineer must also consider the type of flow and the energy of the fluid flow when selecting a flowmeter.

Flowmeters which measure quantity repeatedly measure a fixed volume of fluid. These flowmeters are generally of the reciprocating or rotating piston, nutating disk, or rotary vane type. A limited number of flowmeters are available to measure volume or quantity of fluid flow. There is more selection when choosing a flowmeter to measure rate of fluid flow. These flowmeters generally measure differential pressure, area, velocity, heat area, thermal, or other characteristics of the fluid flow from which the rate of flow may be determined. Examples of types of flowmeters which measure differential pressures include orifice, venturi, flow nozzle, and pitot tube devices. Flowmeters which measure velocity include cup, propeller and turbine type devices. Each of these devices are more or less suitable for a particular application based on conduit size, type of fluid, and required accuracy.

Traditionally, flowmeters have been of the "full bore" design; that is, the flowmeter is of the same size as the conduit in which the fluid is flowing. While this is economical for small conduit sizes, flowmeters for large conduit sizes, e.g., in excess of four inches in diameter, may cost thousands of dollars. Furthermore, the "full bore" flowmeter is typically situated directly in the main conduit line. Thus, when the meter requires service or other maintenance the fluid flow in the main conduit must be stopped which causes operational losses. Still further, "full bore" flowmeters, particularly those in large diameter conduit systems, are exposed to high stresses generated by the fluid flow and potential corrosion or erosion due to fluid exposure. Thus, these meters are typically constructed of heavy duty materials such as cast iron, aluminum, bronze or other similar metals. However, these materials may potentially leach harmful elements, such as lead from bronze, into the fluid flow. This undesirable effect is of particular concern in applications which monitor fluid flow for human or livestock consumption.

In response to the high cost and maintenance of large flowmeters, a class of flowmeters known as "insertion type" flowmeters have become commercially available. Insertion type flowmeters, suitable for applications involving the measurement of flow rate, infer an overall flow rate based on the measurement of fluid velocity at particular locations within the conduit. These types of meters are typically utilized in conjunction with larger conduit sizes (i.e., greater than six inches) and where repeatability, not accuracy, is the prime requirement. The accuracy of insertion type flowmeters is limited by a number of factors including accuracy of the primary and secondary meter elements, the position of the primary meter element when inserted into the fluid stream, the velocity profile of the fluid stream, and variation or uncertainty of the inside diameter of the conduit. A further source of inaccuracy with some types of insertion flowmeters is that they sample the fluid stream at a right angle to the fluid path thus causing an abrupt change in the fluid direction. This abrupt change in fluid direction can cause distortions of the fluid flow which further reduces accuracy. At best, a typical insertion type flowmeter will have an accuracy less than 95%. This compares adversely to a full bore type flowmeter which can have an accuracy exceeding 99%. Such a difference in accuracy can be quite significant. In an exemplary application where fluid flow averages 100 gallons per minute, at the end of one year the potential error in quantity of fluid measured by an insertion type flowmeter compared to a full bore type flowmeter may be over 2 million gallons.

An example of an insertion type flowmeter is described in U.S. Pat. Nos. 3,581,565 and 3,803,921 to Dieterich. The Dieterich device is a multi-port slidable flow measuring device of the differential pressure class. Specifically, it is a modified pitot tube device incorporating an interpolating tube for averaging fluid samples. In this arrangement the sampling tube is inserted across the fluid path thus sampling the fluid stream at a right angle. As discussed, sampling of the fluid at right angles to the fluid flow is undesirable as this causes an abrupt change in the fluid flow direction thereby causing distortions (such as eddy currents) of the fluid flow and reducing accuracy. The Dieterich device has been used for low flow gas measurements in stacks and flues where the sample is caused to route through a bypass prior to reentering the fluid stream. This bypass, as suggested, contains a costly auxiliary measuring sensor such as a hot wire anemometer device to monitor the gas flow.

The Dieterich device hence is distinguishable from the present invention in that it incorporates a multi-port tube inserted vertically across the fluid path, uses an auxiliary measuring device, is movable within the fluid path, and is adaptable mainly to conduit sizes in excess of three inches. Such a device further requires relatively high mechanical dexterity and know-how to install and operate and, as described, has an undesirably high cost associated with the flow measuring sensor.

It is another object of the present invention to provide an apparatus for measuring total fluid flow within a closed conduit system by a reduced size flowmeter. Accordingly, it is an object of the present invention to provide an apparatus for measuring total fluid flow within a closed conduit system with at least the same accuracy and reproducibility as a full bore flowmeter yet without the cost attendant therewith.

It is still another object of the present invention to provide a method of accurately measuring the rate or quantity of fluid flow within a closed conduit system by measuring the flow of a proportional amount of the fluid flow.

It is a further object of the present invention to provide an apparatus suitable for use with flowmeters constructed of alternative materials such as plastics, ceramics, and metal alloys.

It is still another object of the present invention to provide a fluid flow measuring device readily adaptable for use with most commercially available flowmeters.

SUMMARY OF THE INVENTION

The present invention provides a low cost, highly accurate apparatus incorporating a reduced sized flowmeter to measure the rate or quantity of a proportional amount of fluid flow within a closed conduit system in order to provide measurement of total fluid flow with essentially equivalent accuracy and reproducibility as full bore type flowmeters. In contrast to the Dieterich and other known devices, the present invention has a single port tube horizontally situated and essentially parallel to the fluid path, uses a fixed in-line flow measuring device, is permanent, and is adaptable to all conduit sizes. Once installed it requires no mechanical dexterity to operate and is very economical.

These and other advantages, objects and features of the present invention will become apparent to those skilled in the art by referring to the following written description and figures. The objects and advantages of the invention may be realized and attained by means of the instrumentalities and methods particularly pointed out in the appended claims.

BRIEF DESCRIPTION OF THE DRAWINGS

FIG. 1 is a schematic elevational drawing of an exemplary in-line parallel proportionally partitioned by-pass metering device of the present invention;

FIG. 2 is a side view of the metering device of schematic FIG. 1;

FIG. 3 is a schematic representation of an exemplary fluid flow profile within a conduit; and FIG. 4 is a perspective view of a physical embodiment of the metering device of the present invention.

DETAILED DESCRIPTION OF THE INVENTION

The present invention is directed to a device or apparatus for accurately and economically measuring the flow of fluid within a closed conduit. Shown in FIGS. 1 and 4 is a schematic diagram and physical representation of a metering device 10 of the present invention. The metering device 10 consists of a first inlet tube 12 of diameter $D_2$ having a first end 14 and a second end 16. First end 14 of inlet tube 12 is disposed within main conduit line 11 having diameter $D_1$ to extract in a non-disruptive manner a portion of the fluid flowing within main conduit 11. As shown in the Figures, the diameter $D_2$ of inlet tube 12 is substantially smaller than the diameter $D_1$ of main conduit 11. In order to remove the fluid sample from main conduit 11, inlet tube 12 passes through an aperture 32 formed in the wall of main conduit 11 and is suitably fixed and sealed to main conduit 11 by welding, brazing or other known techniques.

Metering device 10 further includes a reduced size flow meter 28 having an inlet connection 34 and an outlet connection 36. Second end 16 of inlet tube 12 is suitably connected to inlet connection 34 of reduced size flow meter 28 to deliver the extracted portion of fluid to the flowmeter. Reduced size flowmeter 28 is a "full bore" flow meter with a primary device sized to measure the proportional amount of fluid flowing through inlet tube 12 and a secondary device calibrated to display total fluid flow. In this configuration, reduced size flowmeter 28 will measure the proportional amount of fluid flow conducted through inlet tube 12 and display the total amount of fluid flowing through main conduit 11. In accordance with the teachings of the present invention, it is apparent that reduced size flowmeter 28 may be of the quantity or rate measuring type or any commercially available flowmeter.

As further shown in FIG. 1, metering device 10 includes an outlet tube 20 having a first end 24 and a second end 22. First end 24 of outlet tube 20 is suitably connected to the outlet connection 36 of reduced size flowmeter 28 to conduct the extracted fluid from reduced size flowmeter 28 after measurement and to return the extracted fluid to the main conduit line 11. Similar to inlet tube 12, outlet tube 20 passes through an aperture 38 formed in main conduit 11 downstream of aperture 32 and is suitably fixed and sealed to main conduit 11 at aperture 38. Second end 22 of outlet tube 20 is thereby disposed within main conduit 11 to discharge the extracted fluid flow back into the main fluid flow in a non-disruptive manner.

With continued reference to FIG. 1, diameter $D_2$ of inlet tube 12 is proportional to the diameter of main conduit diameter $D_1$. In a preferred embodiment, the ratio of $D_1$ to $D_2$ is in a range of approximately two-to-one to fifty-to-one. In this way under normal flow conditions, a proportional flow of fluid will be extracted by inlet tube 12 and measured by reduced size flowmeter 28. In the present invention this proportional amount of fluid flow is defined by the ratio ($K_{pat}$). In an exemplary embodiment, a theoretical $K_{pat}$ may be calculated as the ratio of the cross-sectional area of the main conduit 11 having a diameter $D_1$, to the cross-sectional area of the inlet tube 14 having a diameter $D_2$. Therefore, the theoretical proportional flow parameter is defined by the following formula:

$$K_{pat} = \frac{\text{Area Of Main Conduit}}{\text{Area Of Inlet Tube}} = \frac{\pi R^2 \text{ Main Conduit}}{\pi R^2 \text{ Inlet Tube}} =$$

$$\frac{\frac{\pi}{4} D_1^2}{\frac{\pi}{4} D_2^2} = \frac{D_1^2}{D_2^2}$$

The total theoretical amount of fluid flow through main conduit 10 may be calculated as the measured amount of fluid flow through the reduced size flow meter 28 multiplied by theoretical $K_{pat}$, the ratio of the area of main conduit 11 to the area of inlet tube 12.

It should be understood, however, that the definition of the theoretical proportional flow parameter $K_{pat}$ is dependant on the fluid flow characteristics and the inter-relationship of $D_2$ and the inlet aperture of the reduced size flowmeter. If the diameter of the inlet aperture of the reduced size flowmeter is less than $D_2$, then its geometry will control in the theoretical $K_{pat}$ calculation and not $D_2$. With reference to FIG. 3, there is shown a typical fluid flow profile within a pipe 42. The length of the flow lines 40, represent schematically the proportional amount of fluid flowing at any particular cross-sectional area of pipe 42. As shown in FIG. 3, the flow lines are longer at the center of pipe 42 and shorter near the walls which indicates that more fluid is flowing in the center of pipe 42 than at the outer walls. This is typical of flow within a pipe where friction along the pipe walls hinders fluid flow. If, as illustrated in FIG. 2, the central axis of inlet pipe 12 is co-linear with the central axis of main conduit 11, the proportional amount of fluid intercepted by inlet pipe 12 would not be equal to the ratio of the areas of the main conduit 11 to the inlet tube 12. In such an example, the theoretical $K_{pat}$ calculation would have to be adjusted accordingly as it is necessarily based on the particular flow characteristics of the fluid being measured.

Thus, the location of the inlet tube 12 within the main conduit 11 will affect the proportional amount of fluid extracted from main conduit 11. Accordingly, it may be advantageous to locate the inlet tube 12 within the main conduit 11 at various positions based on the distribution of fluid flow. In the case of non-uniform flow distributions, for example, the inlet pipe 12 may be located where the flow distribution is equal to the average flow for the entire main conduit 11. In such an example, the original definition of theoretical $K_{pat}$ as the ratio of main conduit area to inlet tube area is valid for calculating total fluid flow. Where the distribution of the fluid flow is unknown, general understanding of fluid flow dynamics suggests an inlet tube location in the lower portion of the conduit halfway between the center of the main conduit and the outer wall.

It should be understood from the foregoing discussion that in practice the actual $K_{pat}$ of the metering device will most likely be something different than the theoretical $K_{pat}$ of the metering device. It will therefore be necessary to calibrate the metering device to determine the actual $K_{pat}$. This calibration should be made in accordance with standard practices for calibrating flowmeters (see e.g., American Water Works Association Standard ANSI/AWWA C700-90). It should be further understood that in practice, the secondary device for converting the primary device's response into an observable quantity would also be calibrated to display actual flow through the main conduit.

For example, with a metering device of the present invention wherein the main conduit diameter $D_1$ is 2 inches, the inlet metering tube diameter $D_2$ is ½ inch, and the bypass flow promotion barrier diameter $D_3$ is 1½ inches (the purpose of the bypass flow promotion barrier to be discussed below), the foregoing formula suggests a theoretical $K_{pat}$ of 16 to 1. The results of actual experimentation with a metering device of the present invention having such dimensional parameters, however, suggests an observed $K_{pat}$ of approximately 12. The experimentation further demonstrated that the observed $K_{pat}$ varied less than 2% over flow ranges from 22 gallons per minute to over 150 gallons per minute, thus reiterating the accuracy of the metering device over a wide range of flow rates. In another series of actual trial runs of the metering device 10, the repeatability of the metering device was shown to vary less than ½ of 1% over repeated samples at the same flow rate. Such trial runs wherein the metering device was constructed of laboratory materials and no consideration was made for streamlining the fluid flow either through the main conduit or through the inlet tube suggests that production versions of the metering device will have even significantly higher accuracies.

As discussed above, one of the advantages of the metering device 10 of the present invention is in the proportionally smaller amount of fluid measured by the reduced size flowmeter compared to the total volume of fluid that flows through the main conduit 11. Previously, use of polymeric, ceramic or metal alloys in construction of flowmeters has been limited because of the inability of such flowmeters to survive the stresses and forces of the piping system. By measuring only a proportional amount of the flow, the stresses on the flowmeter components are greatly reduced thus making it possible to construct flowmeters from alternative materials. Further, since smaller flowmeters typically have longer service lives than larger flowmeters, metering device 10 will have a longer expected life, approximately equal to that of reduced size flowmeter 28, than the comparable full bore flowmeter that would conventionally be utilized for main conduit 11.

Referring again to FIG. 1, inlet tube 12 is shown to have an inlet section 15 which is substantially parallel to main conduit 11. Inlet section 15 is provided to ensure that the fluid flow distribution is not disturbed as fluid is extracted by inlet tube 12. In the preferred embodiment, inlet tube 12 is further designed to avoid abrupt disruptions of the flow within main conduit 11 as it moves around inlet tube 12 and as the extracted portion of fluid flowing within inlet tube 12 is conducted to the reduced size flowmeter 28. Similarly, outlet tube 20 is similarly designed with an outlet section that is substantially parallel to main conduit 11 to provide for non-disrupted fluid flow.

With reference to FIGS. 1 and 2, there is further shown a flow promotion barrier 30. Selective use of a flow promotion barrier reduces the sensitivity of the metering device 10 to air locks, pressure losses and other inherent resistance to flow present within all flow present all flowmeters and thus encourages the flow of the proportionally partitioned amount of fluid through the reduced sized flowmeter 28. Flow promotion barrier 30 is shown as a necked down or venturi section of the main conduit 11 having a beginning diameter approximately equal to the diameter $D_1$ of the main conduit 11. The diameter of the necked down section gradually decreases until it reaches a reduced diameter $D_3$ approximately mid-way through the necked down portion. In the preferred embodiment of metering device 10, the ratio of main conduit diameter $D_1$ to reduced diameter $D_3$ is in a range of approximately one-to-one (i.e. no reduction in diameter) to less than two-to-one.

Flow promotion barrier 30 is positioned between the first end 14 of inlet tube 12 and the second end 22 of outlet tube 20 and may be secured to the main conduit by welding, brazing, or other suitable fastening techniques, or may simply be formed as part of the main conduit structure. It will be appreciated by those skilled in the art, that the flow promotion barrier 30 should be suitably streamlined to avoid the causation of disruptions in the fluid flow. While the longitudinal length and "height" (i.e., $$\frac{D_1 - D_3}{2}$$

as shown in FIG. 1) of the flow promotion barrier 30 can vary, it is believed that the relationship between the two is optimized when the length is approximately 3 to 5 times the height. In this manner disruption in flow through main conduit 11 is minimized, which is a primary consideration in metering device 10. Furthermore, it is to be appreciated that multiple flow promotion barriers 30 may be utilized depending on the flow characteristics of the particular fluid being measured, space restrictions, and the like.

As shown in FIG. 1, metering device 10 still further includes an inlet shut-off valve 18 and an outlet shut-off valve 26. Optional shut-off valves 18 and 26 provide means for isolating reduced size flowmeter 28 from the main conduit fluid flow. Thus, reduced size flowmeter 28 may be serviced or replaced without stopping the fluid flow in main conduit 10.

The foregoing description of the invention has been provided for the purposes of illustration only, and it should be appreciated by those skilled in the art that modifications can be made without departing from the true spirit or fair scope of the present invention. The present invention will therefore be understood as susceptible to modification, alternation, and variation by those skilled in the art without deviating from the scope of the invention as defined by the following claims.

What is claimed is:

1. A method for measuring total fluid flow within a closed conduit system utilizing a reduced size flowmeter comprising the steps of:
   providing an inlet tube with a first portion within a main conduit and aligned substantially parallel with the fluid flow and a second portion extending from inside the main conduit to outside the main conduit and in communication with a reduced size flowmeter;
   extracting via said inlet tube a measurable proportional amount of fluid from said fluid flow within said main conduit;
   measuring the flow of said extracted portion of said fluid with said reduced size flowmeter external to said fluid flow;
   providing a outlet tube with a first and second portion, said second portion being in communication with said reduced size flowmeter and said first portion disposed within said main conduit and aligned substantially parallel to said fluid flow;
   returning via said outlet tube said extracted portion of fluid to said fluid flow within said main conduit;
   promoting said extraction of fluid from said fluid flow within said main conduit by providing a reduced cross-sectional area within said main conduit substantially equally between the points of extracting and returning said proportional amount of said fluid flow said reduced cross-sectional area having a venturi configuration with a length and a height, said length being approximately three to five times said height;
   determining the proportion of said extracted fluid flow; and
   determining total fluid flow within said main conduit.

2. An apparatus for measuring fluid flow within a closed conduit system comprising;
   a main conduit for conducting said fluid flow to be measured, said conduit having a longitudinal axis;
   an inlet tube having a first portion aligned with said longitudinal axis and a second portion which extends from inside said main conduit to outside said main conduit and having a substantially constant diameter, said first portion being operable for extracting a measurable proportional amount of said fluid flow;
   a flowmeter coupled to said second portion of said inlet tube for measuring the flow of said extracted proportional amount of said fluid flow;
   an outlet tube having a substantially constant diameter, a first portion and a second portion, wherein said second portion of said outlet tube is coupled to said flowmeter to receive said extracted proportional amount of said fluid flow after it has been measured and said first portion of said outlet tube is disposed within said fluid flow in said main conduit downstream of said inlet tube, said first portion of said outlet tube being aligned substantially parallel with said longitudinal axis and being operable for returning said extracted portion of fluid to said fluid flow and wherein said outlet tube diameter is approximately equal to said inlet tube diameter; and
   means for promoting said extraction of said proportional amount of said fluid flow by said first portion of said inlet tube, wherein said promotion means comprises a streamlined reduced cross-sectional area having a venturi configuration, said streamlined cross-sectional area having a length being approximately three to five times said height, within said main conduit located substantially equally between said first portion of said inlet tube and said first portion of said outlet tube.

3. The apparatus of claim 2 wherein the ratio of said main conduit cross-sectional area to said reduced cross-sectional area of the flow promotion means is between 1.1-1 to 2-1.

4. The apparatus of claim 2 wherein said main conduit and said inlet tube each have a diameter, and the ratio of said main conduit diameter to said inlet tube diameter is approximately about 2-1 to 8-1.

5. The apparatus of claim 4 wherein said outlet tube has a diameter of approximately the same size as said inlet tube diameter.

6. An apparatus for measuring fluid flow within a closed conduit system comprising:
   a main conduit for conducting said fluid flow to be measured, said conduit having a longitudinal axis;

an inlet tube having a first portion within said main conduit and extending parallel to said longitudinal axis and a second portion extending from inside said main conduit to outside said main conduit, said inlet tube being operable for extracting a measurable proportional amount of said fluid flow;

an outlet tube having a first portion within said main conduit and downstream of said inlet tube and extending parallel to said longitudinal axis and a second portion extending from inside said main conduit to outside said main conduit, said outlet tube being operable for returning said extracted measurable proportional amount to said fluid flow;

said inlet tube second portion and said outlet tube second portion converging to and communicating with a flow meter, whereby said flow meter measures said extracted proportional amount of fluid flow; and venturi means for promoting said extraction of said proportional amount of said fluid flow by said first portion of said inlet tube, said venturi means having a length and a height and wherein said length is approximately three to five times said height, and said venturi means being located substantially equally between said first portion of said inlet tube and said first portion of said outlet tube.

7. The apparatus of claim 6 wherein said main conduit and said inlet tube have a diameter, respectively, and wherein the diameter of the inlet tube is approximately 0.1 to 0.5 times the main conduit diameter.

8. The apparatus of claim 7 wherein the outlet tube has a diameter substantially equal to said inlet tube diameter.

9. The apparatus of claim 6 wherein said main conduit has a diameter and said height of said venturi means is approximately 0.02 to 0.15 times said main conduit diameter.

10. The apparatus of claim 6 further comprising shut-off valves disposed within said inlet tube second portion and said outlet tube second portion, said shut-off valves being operable for prohibiting said extraction of said proportional amount of fluid flow.

11. The apparatus of claim 6 wherein the flow meter comprises a rate type flowmeter.

12. The apparatus of claim 6 wherein the flow meter comprises a quantity type flow meter.

13. The apparatus of claim 6 wherein the flow meter is constructed from non-metallic materials.

* * * * *

UNITED STATES PATENT AND TRADEMARK OFFICE
CERTIFICATE OF CORRECTION

PATENT NO. : 5,333,496
DATED : August 2, 1994
INVENTOR(S) : Paul J. Fenelon

It is certified that error appears in the above-indentified patent and that said Letters Patent is hereby corrected as shown below:

Column 6, lines 60, 61,
delete "all flow present".

Column 8, line 8, claim 1, after "flow" insert --,--.

Column 8, line 49, claim 2, after "length" (first occurrence in application) insert -- and a height, said length--.

Signed and Sealed this

Twenty-fifth Day of October, 1994

*Attest:*

BRUCE LEHMAN

*Attesting Officer*     *Commissioner of Patents and Trademarks*